(12) United States Patent
Smethurst et al.

(10) Patent No.: US 7,529,186 B2
(45) Date of Patent: *May 5, 2009

(54) CONTROL PLANE SECURITY AND TRAFFIC FLOW MANAGEMENT

(75) Inventors: Adrian C. Smethurst, Groton, MA (US); Michael F. Keohane, Shrewsbury, MA (US); R. Wayne Ogozaly, Hollis, NH (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/799,590

(22) Filed: May 2, 2007

(65) Prior Publication Data

US 2007/0201357 A1    Aug. 30, 2007

Related U.S. Application Data

(63) Continuation of application No. 10/307,154, filed on Nov. 27, 2002, now Pat. No. 7,224,668.

(51) Int. Cl.
*H04L 12/66* (2006.01)
*G06F 11/00* (2006.01)

(52) U.S. Cl. .................. 370/229; 370/352; 370/360; 370/401; 379/238

(58) Field of Classification Search .......... 370/229, 370/352, 260, 401, 402, 360, 392, 357, 387; 379/88.2, 224, 238, 207.02, 221.08
See application file for complete search history.

(56) References Cited

U.S. PATENT DOCUMENTS 6,304,568 B1    10/2001    Kim 7,224,668 B1 *    5/2007    Smethurst et al. ........... 370/229
2001/0026612 A1    10/2001    Duspiva et al.
2002/0097672 A1    7/2002    Barbas et al.

OTHER PUBLICATIONS

Park, K. and Lee, H., "On the Effectiveness of Route-Based Packet Filtering for Distributed DoS Attack Prevention in Power-Law Internets," *SIGCOMM'01:* 1-12 (2001).
Re:[RPSEC] Draft Status, from a protocol developer's angle. [online], Jul. 26, 2002 [retrieved on Sep. 18, 2002]. Retrieved from the Internet <URL:https://www1.ietf.org/mailman-archive/working-groups/rpsec/current/msg00167.html>.

(Continued)

*Primary Examiner*—Afsar M. Qureshi
(74) *Attorney, Agent, or Firm*—Hamilton, Brook, Smith & Reynolds, P.C.

(57) ABSTRACT

An internetworking device that provides improved immunity to Denial of Service attacks, and in general, improved Quality of Service (QoS). An internetworking element or other route processor is composed of two main parts, including a data forwarding plane and a control plane; the control plane runs routing, signaling and control protocols that are responsible for determining the packet forwarding behavior by the data plane. Independent control plane processes may be provided; however, they are considered to be a single network entity that is a uniquely addressable port. Packets thus intended for the control plane always pass through a designated point. As a result, a set of port services unique to the control plane may be applied to the control plane port. These control plane port services thus can be utilized to control all packet traffic entering and exiting the control plane processes as a whole.

41 Claims, 6 Drawing Sheets

OTHER PUBLICATIONS

Durham, D., et al., "Elimination of Distributed Denial of Service Attacks using Programmable Network Processors," *Intel Research and Development:* 1-4 (2002).

Flexible Firewalls for Network Processors. [online] [retrieved on Sep. 18, 2002]. Retrieved from the Internet <URL:mhtml:file://C:\tibnet\dad\clients\cisco\utexas.mht>.

* cited by examiner

| CONFIGURATION | COMMENT |
|---|---|
| 500 — class: telnet-class<br>match access-group 140 | Telnet class defined in telnet-acl |
| 502 — policy: control-plane-policy | |
| 503 — class telnet-class<br>police 80000 800 conform transmit exceed drop | A policy map named control-plane-policy which provides a rate limit of 80,000 bps of telnet traffic; exceeding the limit call be dropped |
| 505 — control-plane<br>service-policy control-plane-policy | Attach the control policy to the control plane port |
| 506 — access-list 140 deny tcp host 3.3.3.3 any eq telnet | Allow 3.3.3.3 trusted host traffic |
| 507 — access-list 140 deny tcp host 4.4.4.4 any eq telnet | Allow 4.4.4.4 trusted host traffic |
| 510 — access-list 140 permit tcp any any eq telnet | Rate limit all other telnet traffic |

FIG. 5

CONTROL PLANE SECURITY AND TRAFFIC FLOW MANAGEMENT

RELATED APPLICATION(S)

This application is a continuation of U.S. application Ser. No. 10/307,154, filed Nov. 27, 2002 now U.S. Pat. No. 7,224,668. The entire teachings of the above application(s) are incorporated herein by reference.

BACKGROUND OF THE INVENTION

Computer networks, and in particular the web servers, routers, switches, firewalls and end hosts which make up the Internet as well as private intranets have become critical to the operation of many organizations. Recently there have been a number of highly publicized attacks on network equipment belonging to commercial enterprises, government institutions and major internet service providers. This can clearly affect the ability of these institutions to access information, or even to conduct business as usual. Given the widespread adoption of the Internet, in the not to distant future it is foreseeable that such an attack might actually disrupt the conduct of society in general.

It has been estimated that even a three hour outage of the popular Yahoo servers could cause a loss of commerce and advertising revenue of about $500,000.

Tests have determined that over twelve thousand attacks on five thousand distinct Internet hosts belonging to more than two thousand distinct organizations occurred during a three week period early in 2002.

And, during one week in October 2002, a powerful coordinated electronic attack was directed to the central thirteen servers that manage global Internet traffic. While the attack only lasted for one hour, it caused seven of the thirteen servers to fail to respond.

These attacks, often taking the form of so-called Denial of Service (DoS) attacks, impede the efficient functioning and provisioning of services by network infrastructure elements according to their intended purpose. The impact of such attacks is more pronounced than network congestion itself, due to the concentrated and targeted ability of such attacks to not only deplete specific resources but also clog traffic. In the extreme case, when such attacks are coordinated and distributed over many internetworking devices, they may result in multiple compromised Internet hosts that can disrupt the operation of the Internet itself.

Susceptibility to DoS attacks is an intrinsic problem for any service provisioning system where the occurrence of a potentially valid event (such as the request to make a connection, e.g., a Transmission Central Protocol (TCP SYN packet)) must first be processed to ascertain its validity. This is true even though the processing resources needed to handle a single event may be negligible. While such attacks can take on many forms, they typically generate traffic streams at very high data rates. The devices attempt to service even the simplest of commands being thrown at it an extraordinary rate can therefore cause the device to fail.

More particularly an internetworking device such as a router typically separates its functionality into control plane functions and data plane functions. The data plane is principally responsible for accepting transit packets at input ports and routing or switching them to output ports. On the other hand, the control plane is responsible for higher layer functions of the device, such as establishing routing tables and entering quality service policies. DoS attacks are thus commonly directed at control plane service functions that reside on route processors such as routers, switches, firewalls and the like, since they are the most likely to cause widespread disruption when they fail. These control plane service functions may include the execution of certain protocols such as a Border Gateway Protocol (BGP), Simple Network Management Protocol (SNMP), route table management, memory management and the like. Because the execution of such processes is critical to the operation of the route processor, when such attacks are directed at such functions, they can be devastating.

DoS attacks that target infrastructure devices they may cause a number of problems, including:

$ loss of line protocol keep alive functions, which causes a network connection to drop, leading to route flaps and major network transitions;

$ loss of routing protocol updates which can also lead route flaps and network transitions;

$ causing the control plane to utilize more central processing resources than planned;

$ causing route processors to lock up, or preventing them from completing higher priority tasks;

$ reduced response time at user command line prompts, preventing a human administrator from taking corrective action to respond to an attack;

$ consumption of route processor resources such as memory, buffers, data structures, causing negative side effects in being able to process other traffic;

$ back-up of packet queues leading to indiscriminant drops;

$ ultimately, crashing of the device.

Attempts to solve such problems in the past have included such approaches as Reverse Pass Forwarding (RPF) verification and Selective Packet Discard (SPD). Selectively based distributed packet filtering techniques apply filters to packets arriving from specific known mischievous Internet Protocol (IP) addresses. More sophisticated techniques can detect forged source IP addresses by determining the routes from which such disruptive packets originate.

A second technique is to apply an access list configured on an input interface to explicitly deny or limit specific problematic packet types. Hardware based rate limits can then be implemented as a throttling mechanism for the specific packet types so identified. For example, packets of the type SYN can be specifically rate limited on a particular port or other hardware, at least preventing the rate at which such packets are sent to the control plane. A hardware based rate limit may be applied to RPF failures, Internet Control Message Protocol (ICMP) unreachables, Time To Live (TTL) failures, Maximum Transmission Unit (MTU) failures, Internet Protocol Version 4 (IPv4) option bit packets, or similar packets.

While these methods all provide some level of control plane protection, specific features and implementations vary from platform to platform. There also remain packet types and scenarios in which a stated feature sets do not provide adequate control plane protection.

For example, based on current day capabilities, a system administrator could construct class maps and policy maps that are specific for control plane packets of known type. Once created, however, these policies would need to be included in the access policy for every interface in a network. Since there may typically be hundreds, if not thousands of ports in even a modest network, it is not typically feasible for network administrators to deploy and maintain such features everywhere.

Also, when control plane policies are defined within input port features, a significant performance impact typically results for transit (that is non-control plane) traffic. Because additional control plane classes and policies that need to be executed for transit packets as well as control plane destined packets, overall transit traffic performance is markedly reduced. An interface which previously had no configuration, would be forced to execute control plane policies for every packet it receives. This performance impact, rather than help, could thus actually hinder proper operation of currently deployed infrastructure.

For certain packet types that are destined for both the transit and control planes (i.e. special broadcasts, IPv4 option bits, etc.) it is also not possible to set different yet compatible service policies for packets within such a single class. There is for example nothing inherent in such a packet to help understand whether it is destined to the control plane or should be forwarded as a transit packet.

Thus, it is also not typically possible in all cases to configure specific classes to identify all control plane destined packet types, since these packet types cannot be readily identified, and current interface policies cannot be configured to control them efficiently.

SUMMARY OF THE INVENTION

The present invention is a technique for improved immunity to denial of service attacks, and in general, to provide improved Quality of Service (QoS) for network infrastructure equipment.

In one embodiment, an internetworking device or other route processor is composed of two main parts. These include a forwarding path that operates as a data forwarding plane responsible for per packet processing (e.g., forwarding). Above the data plane is a network operating system that is responsible for operations in a control plane. In the case of a device such as a router or switch, the control plane runs routing, signaling and control protocols that are responsible for determining the packet forwarding behavior by the data plane. The control plane in a router, for example, executes routing or switching protocols, manipulates forwarding tables, per flow quality of service tables, access control lists, and the like.

In embodiments of the invention, based upon information acquired through its control plane processes, packet forwarding behavior of the data plane elements is thus dictated. Data planes thus typically otherwise include a plurality of ports that define physical connection points to the network. Port services are then typically applied to operate on packets entering into or exiting from each individual physical port.

In accordance with embodiments of the present invention, the control plane processes are implemented as independently executing processes. However, the control place processes are collectively arranged as a single addressable entity, to provide the ability to better manage control plane traffic.

More specifically, in embodiments of the invention, a collection of control plane processes are considered to be a single entity that is a uniquely addressable device port. Packets, which are destined to specific control plane processes, are now destined through that specific control plane port, such that such packets intended for the control plane always pass through this designated port. As a result, a set of port services unique to the control plane may be applied to the aggregate control plane port. These control plane port services thus can be ensured to operate on packets entering and exiting each of the control plane processes.

In one embodiment, packets destined to the control plane port can be identified in a number of ways, such as by using information implicit to specific packets (i.e., the recognition of a control plane process address), the result of a routing or switching decision, or by considering other control or configuration information. This allows a route processor to identify candidate packets destined to the control plane port enabling those packets to be processed by the aggregate control plane port services.

Embodiments of the invention provide the ability for a network administrator to prevent denial of service attacks and provide quality of service for control plane packets. A class of packets to be controlled are defined (such as Telnet SYN) and policies are attached to such class. For example, one policy may be to rate limit Telnet SYN packets to a specific rate that is a tolerable rate determined through a specific hardware configuration. The administrator can then apply this limit to the single control plane port, which would limit packets from all ports in the device. A limit command could be applied to the single control plane port rather than modifying the configuration on all ports.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 5 is an example of a set of rules that may be used to configure aggregate control plane services to rate limit Telnet traffic.

DETAILED DESCRIPTION OF THE INVENTION

A description of example embodiments of the invention follows.

Figure 1:
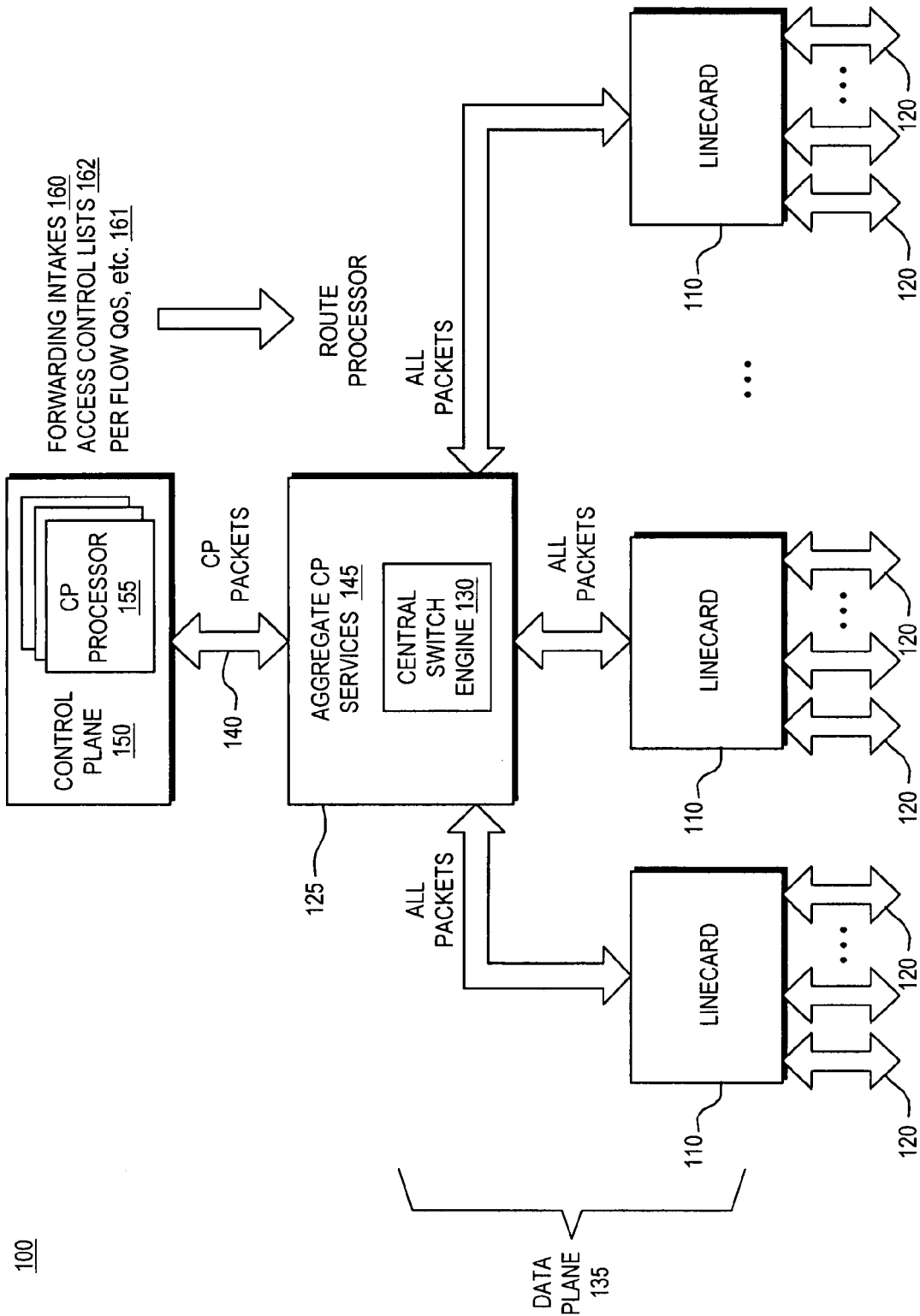
FIG. 1 is a block diagram overview of an internetworking device having an aggregate control plane services function.

FIG. 1 is a block diagram of a typical internetworking device 100 such as a router, bridge, switch, server or the like in which the invention may be implemented. Such an internetworking device 100 consists of a number of functional entities. These include line cards 110 that are responsible for physically attaching to network connections such as ports 120. Each of the line cards 110, typically provide a number of ports 120, such as through Network Interface Adaptors. Packets received from the ports 120 are fed to a route processor 125. In the case where the device 100 is a router or switch, the processor 125 includes a central switch engine 130. A control plane 150 associated with the device 100 is defined as a collection of processes, typically running on the route processor 125. These control plane 150 processes collectively provide high level control for most router/switch Input/Output Services (IOS) functions. These control plane 150 processes could be implemented as software at any level of a system, or as hardware.

As will be understood shortly, the invention herein concerns a control plane port 140, defined as a single access path between the switch engine 130 and the control plane 150. The control plane port 140 may or may not be a single physical port. For example, it may be a virtual address through which packets travel or are routed from the data plane 135 to the control plane 150.

More specifically, the line cards 110 and central switch engine 130 operate to accept packets received on a given port 120 and route them through to another output port 120. These forwarding or data plane 135 components are thus responsible for forwarding network transit packets.

The control plane 150 on the other hand, functions largely independently of the data plane 135. The control plane 150 is responsible for processing routing, signaling and control protocols that dictate the packet forwarding behavior of the data plane 135. Such protocols typically manipulate forwarding tables 160, per flow Quality of Service (QoS) tables 161, access control lists 162, and the like are utilized by the device 100 to make packet forwarding decisions. For example, the control plane 150 might manipulate the forwarding table 160 in the switch engine 130 or change the state of one of the port interfaces 120 in a line card 110 to effect a route change. The control plane 150 is typically not a single process or processor but rather a collection of processes.

The primary goal of Denial of Service (DoS) protection, or otherwise maintaining a specific Quality of Service (QoS) at the control plane 150 is to maintain packet forwarding and protocol states while the device 100 is either under attack or experiencing normal to heavy traffic load. Under these conditions, device 100 should continue to process important packets destined to control plane 150 functions, including protocol control packets, Layer 2 (L2) or Layer 3 (L3) keep alive packets, and the like while at the same time maintaining critical Input/Output Service (IOS) functions.

The central switch engine 130 typically performs high speed Input and Output Services (IOS) for port interfaces such as the line cards 110. An important aspect of the central switch engine 130 is that all packets destined to the control plane 150 must pass through the central switch engine 130 prior to being routed to the functions 155 in the control plane 150. In this instance the central switch engine 130 can be utilized to implement aggregate control plane protection, for all such processes 155 as will be described below.

Figure 2:
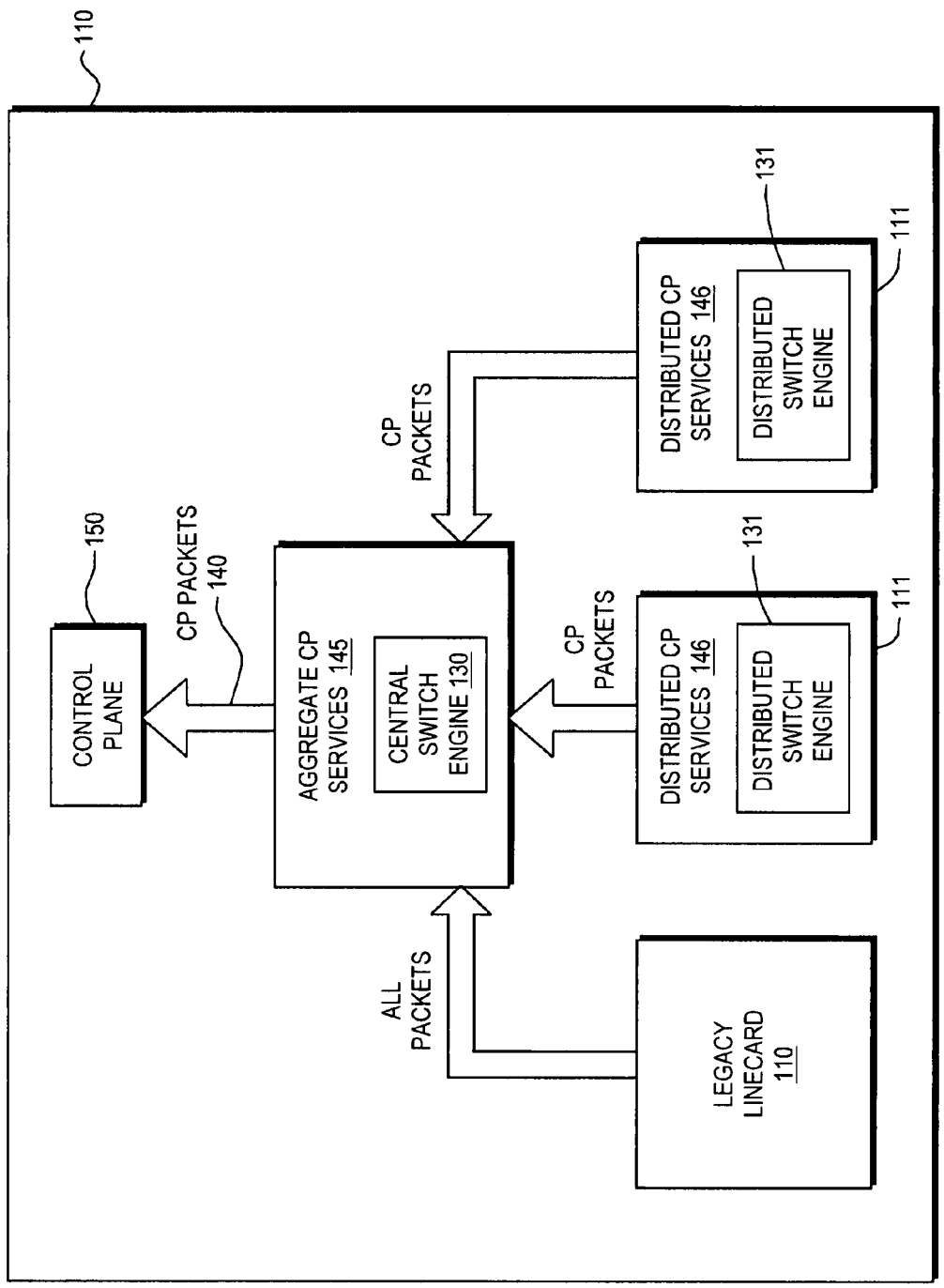
FIG. 2 is a block diagram of a distributed control plane services implementation.

An alternate arrangement shown in FIG. 2, uses a distributed switching engine architecture. This approach provides high speed switching of packets among specialized distributed line cards 111 typically without utilizing any central switch engine 130 resources. In this architecture, a distributed switch engine 131 may perform input and output services for each respective line card 111. In this instance distributed control plane port services will be utilized to implement the specific aspects of the invention described herein.

Regardless of whether the control plane port services are implemented as aggregate port services 145 or as distributed control plane services 146, they perform certain basic functions. Control plane port services most importantly determine if a given packet is destined to a control plane process 150. Such determination can be made through a route look-up mechanism or in other ways. For example, an L2 destination address look-up mechanism may be used for L2 port addresses. Alternatively for an L3 port, L3 destination address lookup functions such as Cisco Express Forwarding (CEF) may be used to identify packets destined to control plane processes 155. Both of the look-up mechanisms are able to identify packets destined for the control plane 150.

With processes 155 in the control plane 150 being treated in this way, the control plane port 140 can be treated as a traditional hardware port. As a result, a full range of traditional port control features can be applied to help protect the control plane 150 from a DoS attack, or to provide other QoS. Such control features can, for example, be implemented as a set of programmed rules that determine whether or not packets arriving at the control plane port 140 qualify for delivery to the control plane and at what level of QoS.

While this will be described in a detailed specific example below, assume as one example that a system administrator would like to limit packets of type TCP/SYN that are destined to the control plane 150 to a maximum rate of one megabit per second. With the control plane 150 being treated as an addressable single port 140, rules can be established to enforce this rate limit, after port input services are applied to the port 120, and after a switching decision is made in the data plane 130. The rules are applied if and only if a packet has been first determined to have a destination of the control plane 150. The specific control plane feature (i.e., rate limit with access list) can then be applied by the control plane services 145 or 146, thus preventing even correctly addressed packets from progressing up to any of the control plane processes 155 if the specific rate limit has been exceeded.

In some instances, an administrator might employ a more complex set of rules. For example, such rules might also be put in place to allow only a system administrator to access the router through a trusted host address. This allows the administrator to connect to the router, even while it is under attack, since the rate limit and access list would permit the session connected from the trusted host while rate limiting other connectors.

In a similar fashion, important packets such as routing protocol control packets can be placed in appropriate hierarchical queues based on priority as determined by the user. This potentially can improve routing convergence rates. Thus, the user is afforded significant control over the flow of traffic destined to the control plane 150 just as if the control plane 150 were a hardware interface. Since control plane 150 destined packets will invoke only control plane services, transit traffic and system performance is minimally impacted. That is, transit packets will not invoke control plane port services, but will continue to invoke normal input and output port services.

Figure 3:
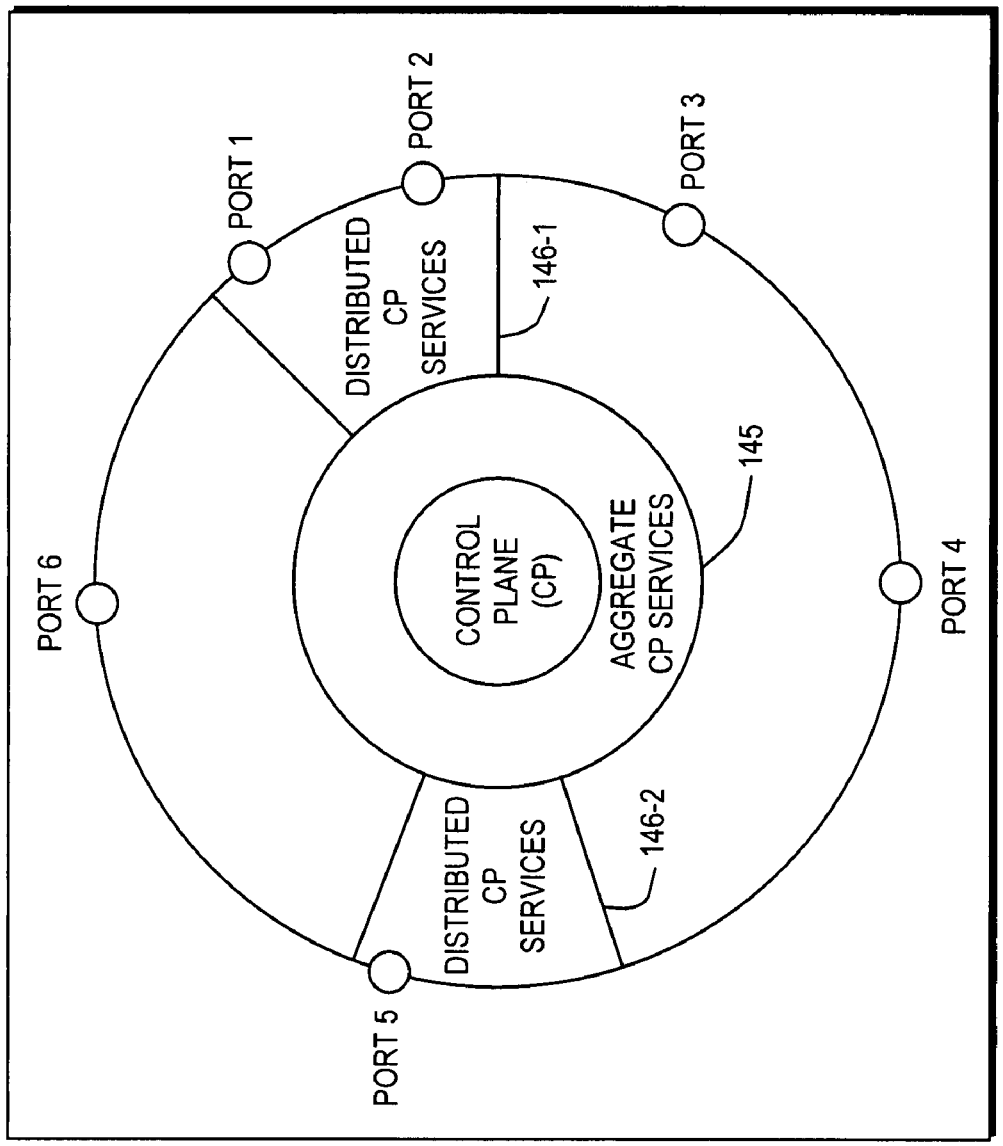
FIG. 3 is a diagram illustrating how distributed control plane services may affect specific ports, and an aggregate control plane services function may provide top level control.

FIG. 3 illustrates how the aggregate control plane services 145 and distributed control plane services 146 can be thought of as providing a hierarchical approach (rings of security) to access control. The central, aggregate control plane services 145 provide a level of service (or control) for all packets received from any port on the device 100. The distributed control plane services 146 provide a level of service (or control) only for those parts with which they are associated, which may be a single port 120 or multiple ports 120. A different level of service may therefore result for ports 1 and 2, serviced by distributed services module 146-1, than for a port 5, which is serviced by a different distributed services module 146-2.

In an implementation such as that shown in FIG. 1, the central switch engine 130 can provide an aggregate level of control plane service 145, which is applied to all control plane packets received from all interfaces. Central switch engine 130 executes the input port services for the control plane port 140 making routing decisions for packets designated for the control plane 150.

Figure 4:
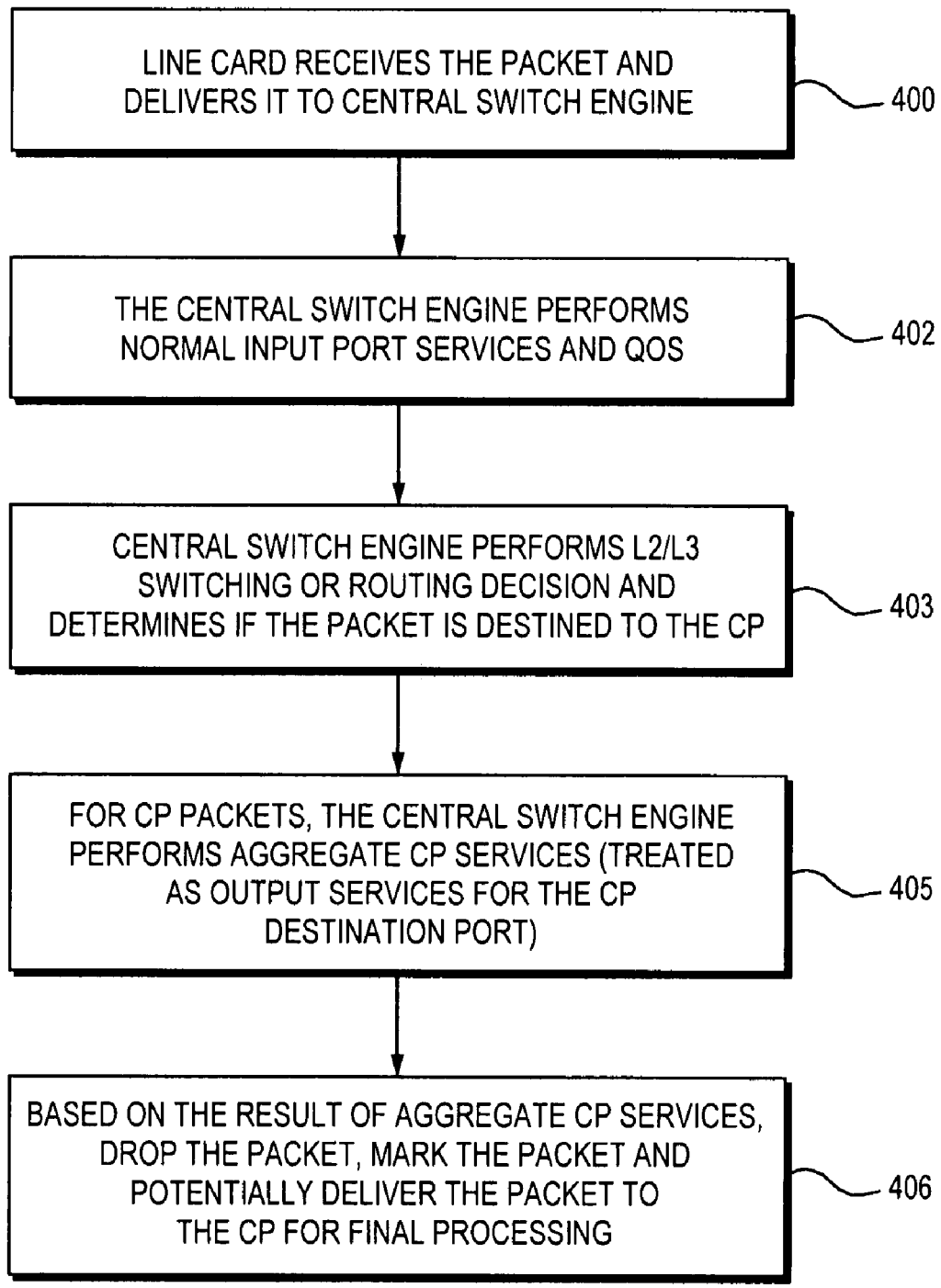
FIG. 4 is a sequence of steps that may be performed in routing control plane packets from the data plane to the control plane in one environment.

One example is shown in the flow chart in FIG. 4. In a first state 400, a line card detects a packet and delivers it to the central switch engine 130. In a next step 402, the central switch engine 130 performs normal input port services and Quality of Service (QoS) processing on the received packet. In a next state 403, the central switch engine 130 performs its normal Layer 2 and Layer 3 switching/routing decision. In the case of a normal transit packet, the packet would be routed to a destination port 120 on an associated line card 110, using for example, the forwarding table information 160. If, however, the packet is destined for a known control plane 150 address, or to an address not on a forwarding table 160, the packet is tagged being destined to as a control plane port. The packet is then routed through the aggregate control plane port 140.

In state 405 the control plane port 140 then performs the aggregate control plane port services on the packet.

In a state 410, based on the results of the aggregate control plane services function 145, the control plane port function will either drop the packet, or mark the packet and potentially deliver it to the control plane 150 for processing.

Class maps and policy maps may be used for both DoS protection and packet quality of service. For the single aggregate port 140 these classifications and policies can be applied to in a known fashion. Consider the control plane services pseudo-example described in FIG. 5. Configuration commands are shown on the left hand side with comments on the right hand side. These types of commands are typical rate limit commands familiar to network administrators. This example is for illustrative purposes only; it should be understood that a whole range of techniques could be used to implement such features.

The particular example limits aggregate control plane services for Telnet type traffic. In a first construction 500, a class map is defined as "telnet-class" . These packets are for example identified by matching the telnet access group 140. Telnet access group 140 matches packets with "TCP field" equal to "telnet". In the next definitional statement 502, a policy map is associated with the "control-plane-policy". The next instructions 503 define the policy assigned to the "telnet-class" as allowing 80,000 bits per second of traffic, with excess traffic being dropped. This rate limit definition is then attached to the control plane port by the following statement 505, which assigns the service policy of "control-plane-policy" to the control plane port. Statement 505 represents a control plane port which could be either aggregate 145 or distributed 146. All other commands specified are common and familiar to system administrators.

Additional attributes of the port services may be defined as access control lists. For example, in statement 506 a trusted address 3.3.3.3 is considered and allowed to have any amount of Telnet traffic. Similarly, in statement 507 another address of 4.4.4.4 is defined as trusted. However all other Telnet traffic is rate limited by the final access list command 510.

The above configuration allows trusted host with source addresses 3.3.3.3 or 4.4.4.4 to forward telnet packets to the control plane without rate limit constraints, and all remaining Telnet packets will be policed to the specified rate.

Specifically, only these packets that match the access control list (ACL) are policed. The last ACL statement 512 includes a match for any packet equal to Telnet. The deny ACL statements allow those packet types to skip the policer and therefore would always be forwarded.

In an alternate scenario, a distributed switch engine is used to provide a distributed level of service as per FIG. 2. The distributed switch engine is such that portions may execute on line cards 111, and other portions may execute in a central location to make the routing decision. But all control plane 150 traffic from all ports 120 still passes through the distributed control plane services, and thus through the control plane port 140.

Figure 6:
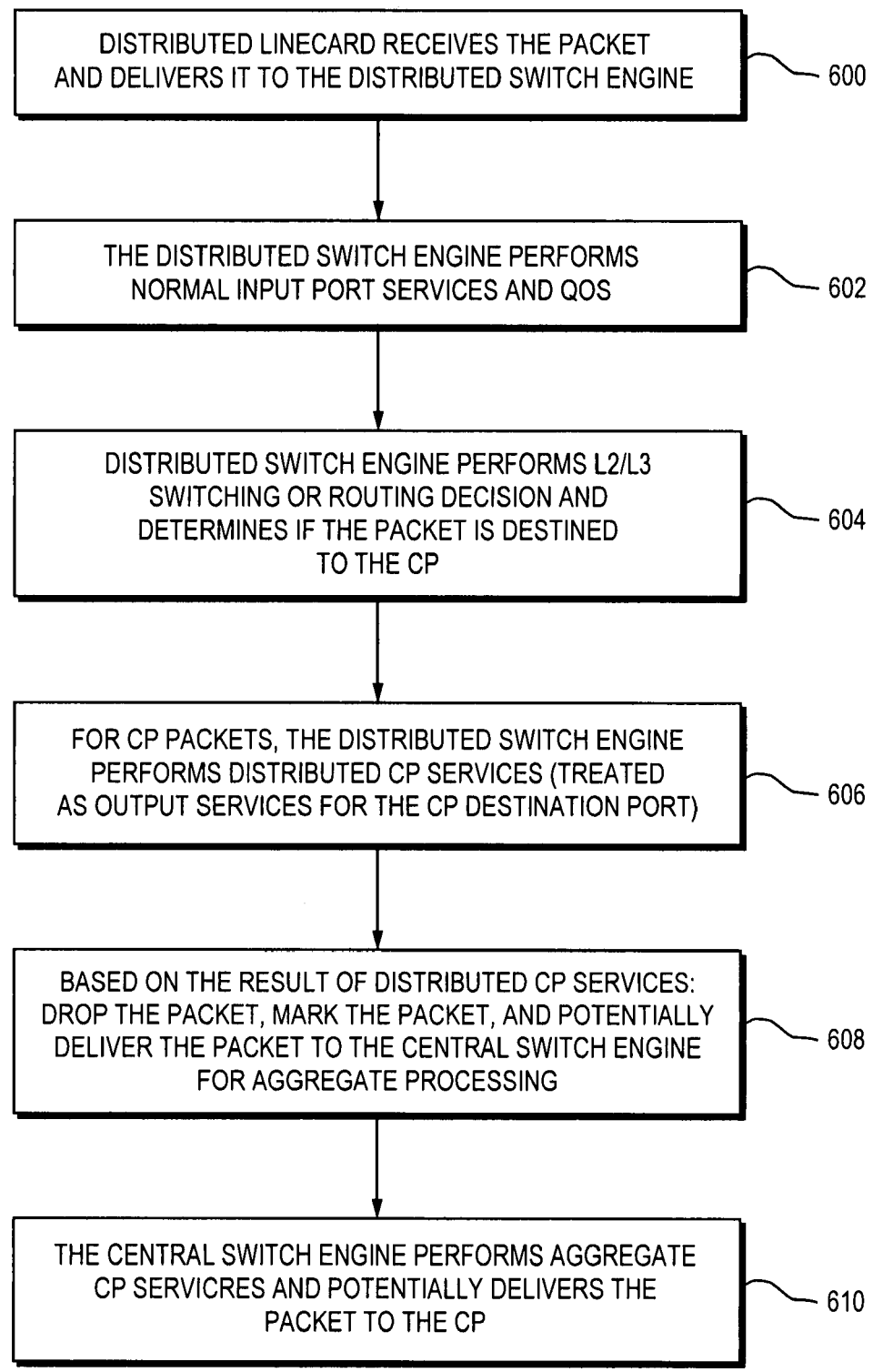
FIG. 6 is a flow chart of the process in a distributed switch engine environment.

FIG. 6 is a sequence of steps that may be performed to implement the invention in such a distributed control plane environment. In a first state 600 a distributed line card receives a packet delivering it to its associated distributed switch engine. In a next state 602 the distributed switch engine performs normal input port services and quality of service processing.

In state 604 the distributed switch engine performs a Layer 2 and Layer 3 switching routing decision, determining if the packet is destined to the control plane 150. For control plane packets in state 606, the distributed switch engine then performs the distributed control plane services (such as the commands of FIG. 5). In state 608, depending upon the result of those distributed control plane services, the packet is either dropped or marked and potentially delivered to the central switch engine 130.

In a state 610 a central switch engine then performs an aggregate control plane service, for example rate limiting telnet packets and then potentially delivering the packet to the control plane should it pass the aggregate control plane services functions.

In general, it can be determined through the use of route look-up mechanisms for L3 ports such as a Cisco Express Forwarding CEF decision, or a Media Access Control (MAC) layer look-up mechanism for L2 ports, if a given packet or packet stream has the destination of the control plane.

However, candidate packets for control planes services 145 may involve a variety of control packet types that are destined to the control plane 150 even if they do not specifically address the control plane. Most of these control plane destined packets fit into one of three categories. These include:

L2 control: These packets include keep alive and control packets for protocols such as HDLC, PPP, FRLMI, ATM control ILMI, x.25 and ISDN call set-up and SDP bpdu.

L3 control: May include routing protocol control packets.

Miscellaneous: May include packets destined to an Internet Protocol (IP) address local to a specific processor 100 or miscellaneous packets such as IP options, or special multi-cast broadcast packets, ICMP packets, unroutable packets and so forth.

Given that determination, a set of rules is then programmed by a system administrator to determine which packets actually qualify for delivery to the control plane 150 and at what rates. With the invention the control plane 150 now considered as a uniquely addressable destination port 145, and being forced to be so. The system administrator can now access a full range of traditional port based features. These may include access control lists and quality of service features.

In one embodiment, the invention may be implemented as a set of software instructions readable by a data processor from a computer readable storage medium. The instructions configure the data processor to perform a method for processing packets in an internetworking device by (a) configuring a plurality of physical network interface ports, each port for providing a physical connection point into a network, and the ports being configurable by control plane processes; (b) executing port services on packets entering and exiting the physical network interface ports, the port services for controlling and monitoring packet flows as defined by control plane configurations; and (c) executing a plurality of control plane processes, the control plane processes providing high level control and configuration of the ports and port services. These instructions additionally comprise (d) accessing the collection of control plane processes as a single control plane port entity, so that a set of control plane port services are applied thereto as a set; and (e) operating on packets destined to the collection of control plane processes in a way that is independent of the individual physical port interface configuration and port services applied thereto.

The full range of traditional port based features applied to the control plane thus replace specialized control plane protection mechanisms. Examples of such supplanted protection mechanisms include SPD or RPF traditional port services, and other specialized control functions. The control plane can now also utilize the same features to not only maintain security but also guarantee quality of service. Although they have been described herein in connection with L2 and L3 packet processing, these features can span the entire ISO seven layer model.

With the control plane being treated as a traditional port, rules can be established using the method according to the invention that is enforced after port input services and the switching decision has been made. These rules are supplied if and only if the packet has been first determined to have a destination of a control plane. As a result transit packet throughput performance is minimally affected because control plane port services are applied if and only if a packet is first determined to have a control plane destination.

While this invention has been particularly shown and described with references to preferred embodiments thereof, it will be understood by those skilled in the art that various changes in form and details may be made therein without departing from the scope of the invention encompassed by the appended claims.

What is claimed is:

1. An apparatus comprising:
    a. a plurality of physical ports, each for providing a physical link to a network connection, the physical ports being configurable by control plane processes;
    b. port services, for operating on packets entering and exiting the physical ports, the port services controlling packet flows, as defined by control plane configurations;
    c. a control plane, comprising a plurality of control plane processes, the control plane processes for providing high-level control of the ports and the port services;
    d. wherein:
        i. a control plane port provides access to the plurality of control plane processes, so that a set of control plane port services can be applied thereto; and
        ii. the control plane processes are accessible through a common control plane port, such that control plane packets originating at a plurality of physical ports and destined to one of the plurality of control plane processes are first processed through the common control plane port, before being processed by individual control plane processes.

2. An apparatus as in claim 1 wherein the control plane port services operate on packets received from specific, predetermined ones of the physical ports and destined to at least one of the control plane processes in a way that is independent of the physical ports and port services applied thereto.

3. An apparatus as in claim 2 wherein the control plane port services are implemented as an aggregate control plane function applied to packets received from multiple physical ports.

4. An apparatus as in claim 2 wherein the services applied to the control plane port are selected from the group consisting of Quality of Service (QoS) functions, packet classification, packet marking, packet queuing, packet rate-limiting flow, control, and other access policies for packets destined to the control plane port.

5. An apparatus as in claim 2 wherein control plane port services are configured as unique entity, separate from physical port services.

6. An apparatus as in claim 1 wherein packets destined to the common control plane port are identified using information implicit to the packets, or information specified in configuration of the apparatus.

7. An apparatus as in claim 6 wherein the control plane port services are applied after a transit packet forwarding decision is made.

8. An apparatus as in claim 6 wherein Layer 2 control packets are identified and forwarded to the control plane port.

9. An apparatus as in claim 6 wherein Layer 3 control packets are identified and forwarded to the control plane port.

10. An apparatus as in claim 1 wherein the control plane processes are distributed across multiple processors.

11. An apparatus as in claim 1 wherein the control plane port services are implemented as distributed control plane port services.

12. An apparatus as in claim 11 wherein the distributed control plane port services provide additional levels of port services beyond those provided by an aggregate port services function.

13. An apparatus as in claim 11 wherein a central processor provides the common control plane port.

14. An apparatus as in claim 11 wherein one or more distributed processors provide the distributed control plane port services.

15. An apparatus as in claim 11 wherein one or more distributed processors deliver packets to the control plane port.

16. An apparatus as in claim 11 where multiple levels of service are provided through a combination of aggregate and distributed control plane port services, for packets destined to the control plane port.

17. An apparatus as in claim 1 wherein a central switch delivers control plane packets to the common control plane port.

18. An apparatus as in claim 1 wherein a central processor provides the common control plane port services.

19. A method for processing packets comprising the steps of:
    a. configuring a plurality of physical ports, each port for providing a physical connection point into a network, and the ports being configurable by control plane processes;
    b. executing port services on packets entering and exiting the physical ports, the port services for controlling packet flows as defined by control configurations;
    c. executing a plurality of control plane processes, the control plane processes providing high level control of the physical ports and port services, and further comprising the steps of:
        i. accessing the plurality of control plane processes as a common control plane port, so that a set of control plane port services are applied thereto; and
        ii. processing packets originating at a plurality of physical ports by passing packets first through the common control plane port, and then to individual control plane processes.

20. A method as in claim 19 additionally comprising the step of:
    operating on packets received from specific, predetermined physical ports and destined to the collection of control plane processes in a way that is independent of the individual physical port interface configuration and port services applied thereto.

21. A method as in claim 20 additionally comprising the step of:

identifying packets destined to the common control plane port using information implicit to the packet or using information specified by a configuration process.

22. A method as in claim 21 additionally comprising the step of:
applying control plane port services after a transit packet forwarding decision is made.

23. A method as in claim 20 additionally comprising the step of applying distributed control plane port services only to the packets received from the specific, pre-determined physical ports.

24. A method as in claim 23 additionally comprising the step of:
providing additional levels of port services beyond those provided by an aggregate port services function.

25. A method as in claim 23 wherein one or more distributed processors provide the distributed control plane ports.

26. A method as in claim 23 wherein one or more distributed processors deliver packets to the common control plane port.

27. A method as in claim 23 additionally comprising the step of:
providing multiple levels of service through a combination of aggregate and distributed control plane port services.

28. A method as in claim 20 wherein a central processor delivers control plane packets to the control plane port.

29. A method as in claim 20 additionally comprising the step of:
providing control plane port services in a central processor.

30. A method as in claim 20 wherein the step of applying port services to the common control plane port additionally comprises a step of applying services selected from a group consisting of Quality of Service functions, packet classification, packet marking, packet queuing, packet rate limiting, flow control, and other access policies for packets destined to the control plane port.

31. A method as in claim 19 wherein the common control plane processes execute as a distributed processes across multiple processors.

32. A method as in claim 19 wherein the common control plane port services execute as an aggregate control plane function applied to packets received from multiple physical ports.

33. A method as in claim 32 wherein a central processor provides the common control plane port services.

34. A method as in claim 33 wherein Layer 2 control packets are identified and forwarded to the control plane port.

35. A method as in claim 33 wherein Layer 3 control packets are identified and forwarded to the control plane port.

36. A method as in claim 19 additionally comprising the step of:
configuring the common control plane port services as an entity separate from physical port services.

37. A device for processing packets comprising:
a. means for configuring a plurality of physical ports, each port for providing a physical connection point into a network, and the physical ports being configurable by control plane processes;
b. means for executing port services on packets entering and exiting the physical network interface ports, the port services for controlling and monitoring packet flows as defined by control plane configurations;
c. means for executing a plurality of control plane processes, the control plane processes providing high control of the ports and port services, and additionally comprising:
   i. means for accessing the plurality of control plane processes as a common control plane port, so that a set of control plane port services are applied as a set; and
   ii. means for processing packets originating at a plurality of physical ports, by passing packets through the common control plane port, rather than directly from the physical ports, and then to individual control plane processes.

38. An apparatus as in claim 37 wherein the control plane port additionally comprises means for operating on packets received from specific, predetermined physical ports and destined to the collection of control plane processes in a way that is independent of the individual physical port interface configuration and port services applied thereto.

39. An apparatus as in claim 37 additionally comprising:
means for identifying packets destined to the common control plane using information implicit to the packet or using information specified in configuration.

40. A computer readable storage medium containing instructions readable by a computer to configure the computer to perform a method for processing packets in an internetworking device comprising:
a. configuring a plurality of physical network interface ports, each port for providing a physical connection point into a network, and the ports being configurable by control plane processes;
b. executing port services on packets entering and exiting the physical network interface ports, the port services for controlling and monitoring packet flows as defined by control plane configurations;
c. executing a plurality of control plane processes, the control plane processes providing high level control and configuration of the ports and port services, and additionally comprising the steps of:
   i. accessing the collection of control plane processes as a common control plane port, so that a set of control plane port services are applied together thereto; and
   ii. passing packets first through the common control plane port, and then to individual control plane processes, rather than directly from the physical ports.

41. A medium as in claim 40 wherein the control plane port processes packets originating at a plurality of physical ports, the method additionally comprising:
operating on packets received from specific, predetermined physical ports and destined to the collection of control plane processes in a way that is independent of the individual physical port interface configuration and port services applied thereto.

* * * * *